(12) United States Patent
Peles et al.

(10) Patent No.: US 8,982,245 B2
(45) Date of Patent: Mar. 17, 2015

(54) METHOD AND SYSTEM FOR SEQUENTIAL VIEWING OF TWO VIDEO STREAMS

(75) Inventors: David Peles, Haifa (IL); Ofer Salomon, Maalot (IL); Dan Shulman, Zichron Yaakov (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 196 days.

(21) Appl. No.: 13/578,821

(22) PCT Filed: Feb. 21, 2011

(86) PCT No.: PCT/IB2011/050693
§ 371 (c)(1),
(2), (4) Date: Aug. 14, 2012

(87) PCT Pub. No.: WO2011/101818
PCT Pub. Date: Aug. 25, 2011

(65) Prior Publication Data
US 2012/0307113 A1    Dec. 6, 2012

(30) Foreign Application Priority Data

Feb. 21, 2010    (IL) .......................................... 204087

(51) Int. Cl.
*H04N 5/262*    (2006.01)
(52) U.S. Cl.
CPC ..................................... *H04N 5/262* (2013.01)
USPC ....................................................... 348/239
(58) Field of Classification Search
CPC ..... G06T 15/20; G06T 2210/44; G06T 13/00; G06T 3/0093; G06T 2207/10016; G06T 3/4007; G06T 5/50; G06T 15/30; G06T 2200/32; G06T 15/205; G06T 5/003; G02B 27/0093; H04N 19/0026; H04N 19/00721
USPC ............. 348/239, 208.12, 208.13, 222.1, 252
See application file for complete search history.

(56) References Cited

U.S. PATENT DOCUMENTS

| 2004/0085451 | A1 | 5/2004 | Chang |
| 2007/0110338 | A1 | 5/2007 | Snavely et al. |
| 2008/0298571 | A1 | 12/2008 | Kurtz et al. |
| 2009/0279612 | A1 | 11/2009 | Pandit et al. |
| 2010/0026712 | A1 | 2/2010 | Aliprandi et al. |
| 2010/0039380 | A1 | 2/2010 | Lanier |

FOREIGN PATENT DOCUMENTS

EP    0671850    9/1995

*Primary Examiner* — James Hannett
*Assistant Examiner* — Padma Haliyur
(74) *Attorney, Agent, or Firm* — Mark M. Friedman (57) ABSTRACT

An apparatus for facilitating sequential viewing of streams of images of a common scene. The images are captured by an image sensor system having different viewing configurations generating visually dissimilar views. The electronic circuitry is configured, on transition between a first and a second viewing configurations, to input images captured using the first or second viewing configurations, and to generate a signal, derived from the input images. The signal corresponds to a gradual graphic transition between images captured using the first and the second viewing configurations, thus simulating a continuous viewing of the common scene. The gradual graphic transition includes transition due to a change of viewing direction, a change of aspect ratio, a change of sensor technology, a change of spectral sensitivity, a change of sensor sensitivity, a change of spatial resolution a change of sensor location, a change of binning level a change of displayed region of interest.

23 Claims, 5 Drawing Sheets

METHOD AND SYSTEM FOR SEQUENTIAL VIEWING OF TWO VIDEO STREAMS

BACKGROUND OF THE INVENTION

1. Field of the Invention

The invention is in the field of imaging and photography and in special it relates to several image sensors viewing a common scene and to the presentation of the streams of images without losing orientation on transition between the sensors.

2. Description of Related Art

It is quite common currently to have several image sensors or video cameras viewing the same scene. Also, a camera may have several viewing configurations, zooming factors or view directions for example. Such imaging systems are disposed on airborne platforms, in airports, traffic systems, etc. The most sensitive scenes are supervised by a human operator who may switch between cameras or between camera configurations. In particular, a sensor having switchable zooming factor may be switched by an operator in a discontinuous manner. Such a discontinuous switchable zoom optics may be used in an airborne surveillance platform. A remote controller in a control room may watch a screen divided to a 3×3 image matrix presenting nine streams of images captured simultaneously by nine cameras covering a scene of interest with images capturing large fields of view. A second full screen presents a stream of images from a selected camera, whereas the controller determines the selected camera and its field of view or zooming factor using a joystick module or a touch screen. Suppose that the controller noticed that an event of interest is occurring in a certain location and she switches the full screen from a first camera to a second camera and/or switch the wide field of view to a narrow field of view. At that moment of transition, the controller might lose orientation of the scene since it is now shown from another direction and/or with a entirely different field of view. Thus, it is desirable to make such switching or transition more natural, such that it seems like a stream of images emitted from a single camera moving gradually from the first viewing direction to the second viewing direction, or changing the field of view continuously.

EP 95301408.1 application by the same applicant as the current disclosure describes method and apparatus for smoothing out stepwise changes of field of view (FOV). However, it deals only with changing field of view, or zooming (in and out) while the present application deals with other changes of the viewing configuration. In addition, the current application discloses several novel features and techniques which may be used for a variety of viewing configuration transitions, including change of FOV.

It would be advantageous to provide a system and a method to smoothly integrate streams of images of a common scene.

BRIEF SUMMARY OF THE INVENTION

It is provided according to certain implementations of the invention apparatus for facilitating sequential viewing of streams of images of a common scene. The images are captured by an image sensor system comprising image sensors. The image sensor system has different viewing configurations generating visually dissimilar views of the common scene.

The electronic circuitry is configured, on transition between a first viewing configuration and a second viewing configuration, to input images captured using the first or second viewing configurations, and to generate a signal, derived from the input images. The signal corresponds to a gradual graphic transition between images captured using the first viewing configuration and images captured using the second viewing configuration. The gradual graphic transition simulates a continuous viewing of the common scene. In some embodiments, the gradual graphic transition is different from a zooming only transition, including transition due to other changes, for example a change of viewing direction, a change of aspect ratio, a change of sensor technology, a change of spectral sensitivity, a change of sensor sensitivity, a change of spatial resolution a change of sensor location, a change of binning level, a change of displayed region of interest, a change of displayed resolution, a change of optical distortions, a change of focal length and a change of the camera focus.

A viewing configuration may be characterized by a variety of parameters. Exemplary parameters are field of view, an aspect ratio parameter, a location of an image sensor having the viewing configuration, and a viewing direction of the viewing configuration. Each two viewing configuration may be different by having a different value for one of these parameters.

In some embodiments, the electronic circuitry includes a merging module adapted for merging an image captured using the first viewing configuration with an image captured using the second viewing configuration. The merging of images is conducted, for example, by fusing, blending, embedding and blurring, as well as by combinations of two or three techniques of fusing, blending, embedding and morphing.

It is provided according to certain implementations of the invention, a system which includes an image sensor system of a common scene, a user interface and electronic circuitry. The image sensor system includes image sensors and has different viewing configurations generating visually dissimilar views of a common scene. The user interface includes a display for displaying a stream of images captured by a first viewing configuration followed by a stream of images captured by a second viewing configuration. The electronic circuitry is associated with the image sensor system and with the user interface. The electronic circuitry is configured, on transition between a first viewing configuration and a second viewing configuration, to input images captured using the first or the second viewing configurations. The electronic circuitry is also configured to generate a signal, derived from the input images, and corresponds to a gradual graphic transition between images captured using the first viewing configuration and images captured using the second viewing configuration. The gradual graphic transition simulates a continuous viewing of the common scene, and is preferably different from a zooming only transition.

In some embodiments, the image sensor system includes a first image sensor and a second image sensor associated respectively with the first and second. viewing configurations. Preferably, the first and second image sensor have different spectral sensitivities.

In some embodiments, the system includes a configuration database adapted for storing data on parameters associated with the different viewing configurations.

In some embodiments, the system includes a graphic transition database adapted for storing parameters associated with gradual graphic transitions, whereas each transition is between a pair of different viewing configurations.

In some embodiments, the user interface is connected to image sensors, whereby streams of images are being fed to said user interface directly from the image sensors until a transition between viewing configurations occurs and the user interface begins to be fed by the electronic circuitry.

It is provided according to certain implementations of the invention, a method for facilitating sequential viewing of streams of images captured using different viewing configurations generating visually dissimilar views of a common scene. The method includes inputting images captured using a first or a second viewing configurations, on transition between the first viewing configuration and the second viewing configuration, and generating a signal, derived from one or more of the input images. The signal corresponds to a gradual graphic transition between images captured using the first viewing configuration and images captured using the second viewing configuration. The gradual graphic transition simulates a continuous viewing of the common scene and is different from a zooming only transition.

In some embodiments, the method includes the step of receiving an input indicative of a transition between a first viewing configuration and a second viewing configuration. Alternatively, the method includes the step of issuing a command to make a transition between a first viewing configuration and a second viewing configuration. Also, the method includes automatic detection of a transition between two viewing configurations. To this aim, the method makes use of standard techniques for matching consequent video frames to detect substantial change of the viewing configuration. Similarly, to detect change of spectral sensitivity or sensor sensitivity, comparative brightness histogram may be used.

In some embodiments, the gradual graphic transition is associated to translation, linear, affine, homographic, morphing, optical flow, and three-dimensional transformations. These transformations or other transformations may include interpolation steps.

In some embodiments, the method includes the step of storing sets of parameters associated with gradual graphic transitions, whereas each set is associated to a transition between a pair of different viewing configurations.

In some embodiments, the method includes the step of blending images associated with images captured using the first or the second viewing configurations.

In some embodiments, the method further includes the step of embedding an image associated with the signal within images captured using the first viewing configuration. The embedded image may be a framed image.

In some embodiments, the signal includes two or more images derived from a single image captured using the first viewing configuration, thereby displaying a frozen scene.

In some embodiments, there is a delay of a certain period of time until images of a certain desired quality are captured by the second viewing configuration. For example, a delay is caused in the process of re-focusing a camera. One or more images derived from a single image captured using the first viewing configuration are displayed during that delay.

In some embodiments, the method is used in offline processing of an event captured using different viewing configurations generating visually dissimilar views of the event.

A program of instructions may be tangibly embodied in a program storage device or media readable by a computerized apparatus. The program is executable by the computerized apparatus to perform the method for facilitating sequential viewing of streams of images captured using different viewing configurations of a common scene.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

DETAILED DESCRIPTION OF THE INVENTION

The present invention will now be described in terms of specific example embodiments. It is to be understood that the invention is not limited to the example embodiments disclosed. It should also be understood that not every feature of the methods and systems handling the described device is necessary to implement the invention as claimed in any particular one of the appended claims. Various elements and features of devices are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

Figure 1:
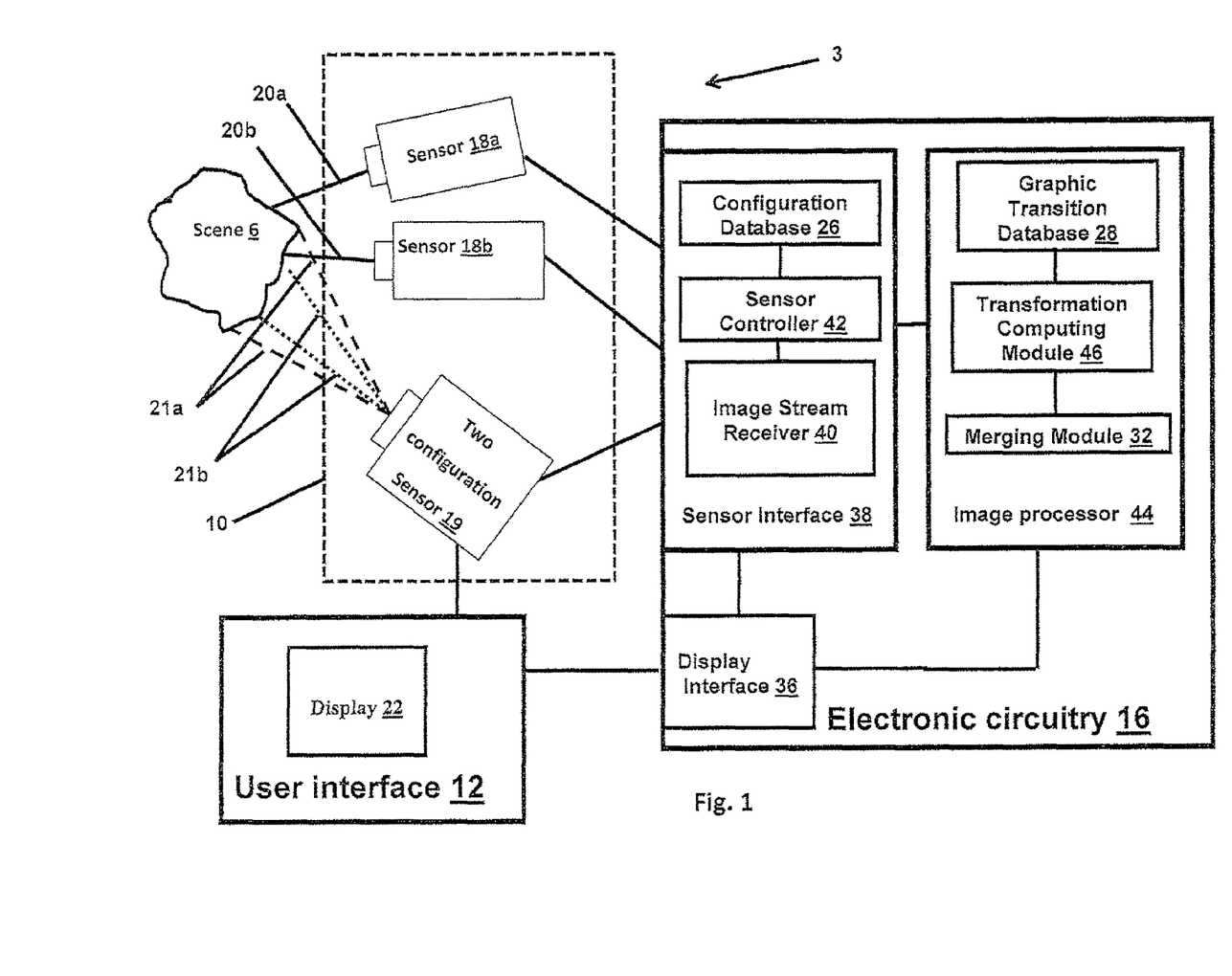
FIG. 1 is a block diagram of a system for sequential viewing of streams of images captured using different viewing configurations of a common scene.

FIG. 1 shows a system 3 for facilitating sequential viewing of streams of images captured using different viewing configurations which generate visually dissimilar views of a common scene 6. System 3 includes an image sensor system 10 viewing common scene 6, a user interface 12 and electronic circuitry 16. In the example of FIG. 1, image sensor system 10 includes image sensors 18a, 18b, and 19. Image sensor 18a has an associated viewing configuration characterized by viewing direction 20a connecting image sensor 18a, and the center of scene 6. Image sensor 18b is placed in a location different from the location of image sensor 18a, and consequently it has a different viewing configuration which is characterized by viewing direction 20b which is different from viewing direction 20a. Image sensor 19 has two viewing configurations which are different from one another by a zoom factor or by the field of view, a wide field of view 21a, and a narrow field of view 21b.

Generally speaking, a viewing configuration may be characterized by a variety of parameters. Exemplary parameters are a zoom parameter, an aspect ratio parameter, a location of an image sensor having the viewing configuration, and lines of sight 20a and 20b connecting a part of scene 6 to respective image sensors 18a and 18b. Additional exemplary parameters are sensor sensitivity which is different in day and night sensors or in day and night states of the same sensors, and mono/poly chromaticity corresponding respectively to monochrome and color sensors. Also two sensors may have different spectral sensitivities. For example, a visible wavelength sensor and an infra-red wavelength sensor have different spectral sensitivities. The visible sensor is sensitive around wavelengths of 400 nm, 600 nm and 700 nm and the infra-red sensor is sensitive around wavelengths of 700 nm, 900 nm and 1050 nm. In such a case, rather than a discrete characterizing parameter, a full spectral response curve serves as a parameter.

The two sensors may be different by being sensors of different technologies. A variety of sensor technologies is available nowadays, optical, RADAR (radio detection and ranging), LADAR (light detection and ranging), SAR (synthetic aperture RADAR), active infra-red sensing and passive infra-red sensing.

Also, a sensor may have a very high resolution, whereas its output depends on adjustable binning level. Binning is a process for replacing several pixels by a representing single pixel. For example, a determined feature of the single pixel is the average or median of that feature over all the several pixels. Change of binning level occurs, for example, when a camera of very high resolution is used for either capturing a broad field of view or capturing a scene at very large distance. Suppose that in the initial configuration of the camera the available field of view is displayed, while in the final configuration, a small portion of the field is displayed. For the first configuration the captured images are binned or digitally zoomed out with a certain number of pixels represented by a single pixel, to get an image of lower resolution displayable on an operator display of relatively low pixel density. The final field of view is small enough to utilize the full available resolution.

In accordance with the present disclosure, a transition between the camera initial configuration and the camera final configuration is done gradually with intermediate steps of decreasing extent of binning, increasing resolution and decreasing field of view. The intermediate processing may be done on portions of respective decreased size of the images issued by the camera while in the initial camera configuration.

The term "visually dissimilar views" represents the difference between the generated views as a result of having different values for at least one characterizing parameter.

Figure 2A:
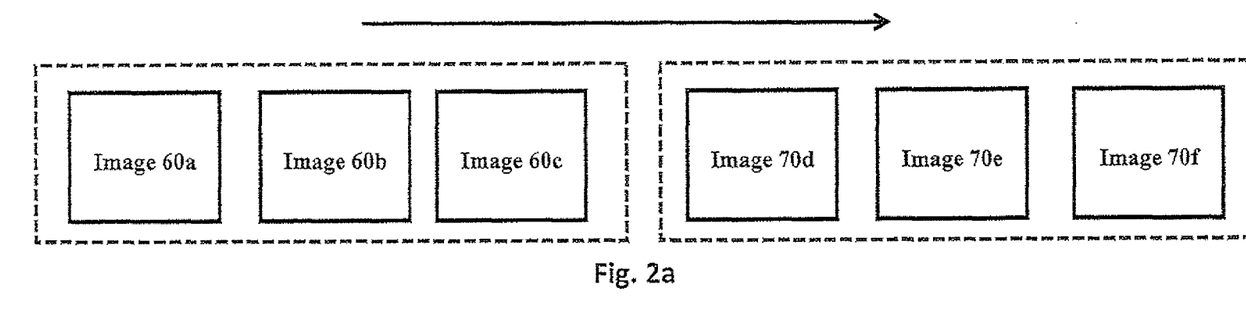
FIG. 2a is a block diagram of a series of images captured using a first viewing configuration followed by a series of images captured using a second viewing configuration.

Referring now to FIG. 2a, the user interface 12 includes a display 22 which displays a stream of images 60a, 60b and 60c captured by the first viewing configuration, followed by a stream of images 70d, 70e and 70f captured by the second viewing configuration. As detailed below, applying the disclosed invention causes replacement of several images by other images to smooth the transition from the first viewing configuration to the second one.

The electronic circuitry 16 is associated with the image sensor system 10 and with the user interface 12. The electronic circuitry 16 is configured to input image 60c captured using the first viewing configuration or to input image 70d captured using the second viewing configuration. The image inputting occurs on transition between the first viewing configuration and the second viewing configuration, as elaborated below.

The electronic circuitry 16 is also configured to generate a signal, derived from the input images, which corresponds to a gradual graphic transition between images 60a, 60b and 60c and images 70d, 70e and 70f. The signal is associated with images 80d and 80e of FIG. 2b, such that the gradual graphic transition simulates a continuous view of common scene 6. In other words, the exemplary stream of images 60a, 60b, 60c, 80d, 80e and 70f is viewed in the display 22 as a continuous stream of images of the common scene 6. As a consequence, the viewer is kept oriented with scene 6, despite the transition between viewing configurations. Note that the signal associated with images 80d and 80e may be derived from input image 60c, 70d, or 70e. It also may be derived from a combination of two images, image 60c and image 70d, for example.

Returning now to the term "on transition between the first viewing configuration and the second viewing configuration", it should be noted that the term relates to timing and/or context as may be understood from the following two examples. In the first example, the disclosed invention is implemented in a control room of a live event like traffic at a junction during rush hours. One screen is divided to a 3×3 image matrix and presents nine streams of images captured simultaneously by nine video cameras which encircle the junction. A second full screen presents a stream of images from a selected camera, whereas the controller determines the selected camera using a joystick module. The electronic circuitry 16 is linked to the joystick module and it receives an input indicative of a transition between cameras. Thus, the term "on transition" relates to moment of receiving that input.

In a second example, the disclosed invention is implemented in offline processing or post processing, or reconstruction, of streams of images captured by several fast photography cameras viewing a crash experiment of a millisecond total duration. In an exemplary offline processing, an editor makes a slow motion movie using captured images for presentation to a technical team or in a scientific conference. The editor decides that at 35 microseconds after the event has started, the movie should stop showing images from camera 18b and start to show images from camera 19. In this case, the term "on transition" relates to the context of the editor decision.

Electronic circuitry 16 may include a configuration database 26 adapted for storing data on parameters associated with the different viewing configurations. For example, for two configuration sensor 19, the database stores a first configuration with 16° as a FOV parameter and $(\alpha_1,\beta_1,\gamma_1)$ as viewing direction parameters and a second configuration with 4° as a FOV parameter and $(\alpha_1,\beta_1,\gamma_1)$ as viewing direction Parameters.

Also, the electronic circuitry 16 may include a graphic transition database 28 adapted for storing sets of parameters associated with gradual graphic transitions. Each set of parameters is associated with a transition between a first viewing configuration and a second viewing configuration of a pair of different viewing configurations. Graphic transition database 28 may speed the operation of system 3, as follows. On building the sensor image system one determines or calculates a set of transition parameters for each possible pair of two different viewing configurations and stores the parameter set in database 28 with an appropriate label for each pair. For example, in transition between viewing direction 18a and viewing direction 18b, one parameter may be an indication that two virtual images from two virtual viewing directions between camera 18a and camera 18b are used in transition. A second parameter and a third parameter indicate the two virtual viewing directions. On transition between different viewing configurations of a certain pair, electronic circuitry 16 finds the relevant parameter set and generates the signal accordingly. Thus, the determination or calculation of the relevant parameter set is done only once, decreasing the computational load significantly.

Figure 2B:
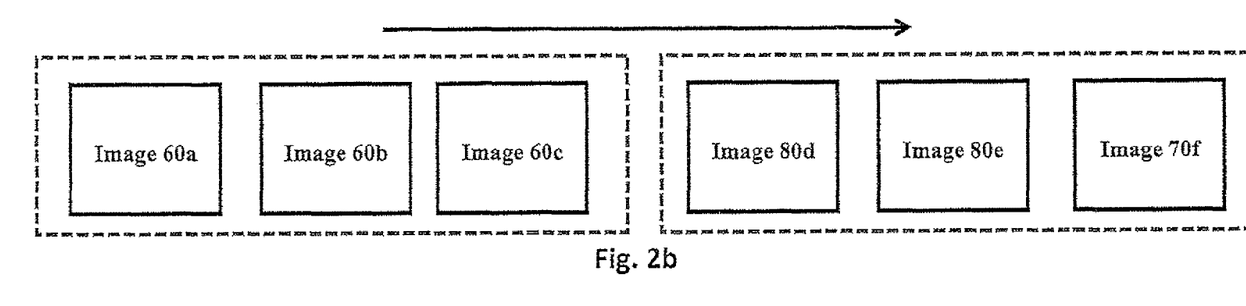
FIG. 2b is a block diagram of a series of images captured using the first viewing configuration followed by two images associated with a generated signal and by an image captured using the second viewing configuration.

In some embodiments, the workload on the electronic circuitry 16 is decreased by a direct connection of the user interface 12 with image sensors 18a, 18b and 19 which feed streams of images 60a, 60b, etc, directly to the user interface. On transition between viewing configurations, the electronic circuitry 16 takes over the control of the user interface 12 and generates a signal that causes appropriate images 80d and 80e to appear on the display rather than respective images 70d and 70e. Below, after a description of possible internal structure of the electronic circuitry 16, a description is outlined of switching the user interface 12 from being fed directly by image sensors 18a, 18b and 19 to being fed by the electronic circuitry 16.

In some embodiments, the electronic circuitry 16 includes a merging module 32 adapted for merging images. The merging of images is conducted, for example, by fusing two images, blending two images, morphing two images or embedding one image within the other one. In one example, an image generated from image 60c is blended with image 70d to get image 80d. Blending two images is done by combining the two images with a changing weight. Initially, a first image has a weight of 1 while a second image has a weight of 0. Gradually, the first image weight decreases while the second image weight increases, and finally the first image has a weight of 0 while the second image has a weight of 1.

Fusing is sometimes used as a synonym to blending. Here, it also represents spatial merging whereas different portions of the images are blended gradually in a different rate.

In some embodiments electronic circuitry 16 is functionally or physically divided to three modules. The first module is a display interface 36 for interaction with the user interface 12. The second module is the sensor interface 38 for interaction with the image sensor system 10. Interface 38 includes configuration database 26, and an image stream receiver 40 to receive, and store if desired, the streams of images from the sensors 18a, 18b and 19. Interface 38 includes also a sensor controller 42 for controlling the transitions between viewing configurations. Note that controlling the transitions may be alternatively done externally by a remote human controller, for example.

The third module of electronic circuitry 16 is an image processor 44 which may include the graphic transition database 28 and the merging module 32 mentioned here above. Processor 44 may also include a transformation computing module 46 for performance of various calculations desired in the generating the signal. Note that a gradual graphic transition may be associated to zoom in zoom out, translation, linear or affine or homographic transformations. Such transformation, as well as other transformations are accompanied by a high computational load, and should be done by special numerical codes.

The gradual graphic transition may be associated to a transformation which includes several interpolation steps. In a typical interpolation step, an intermediate image is calculated using known images. Morphing, for example, uses known methods for optical flow to match each pixel from an image taken by camera 18a with an image taken by camera 18b. The transition video stream is created by generating synthetic images in which each pixel is gradually shifted from its position in the image taken at camera 18a to its position in the image taken at camera 18b. This change in position of each pixel may be integrated with a gradual change of the pixel gray level and color. Namely, the pixel gray level and color are been gradually transformed from their values in the image of camera 18a to their values in the image of camera 18b. The position, gray level and color change simultaneously in a coordinated manner. Local image blurring\sharpening may be used in a transition between sensors of different image sharpness. Areas which appear sharp\blurred in the image of the first sensor may be gradually blurred\sharpened to match their appearance in the second sensor. Differences in local sharpness in the images may be caused by various optical parameters such as the sensors depth of focus and the range for which the sensors are best focused.

The intermediate images may be created by a three-dimensional (3D) simulation of an imaginary image sensor which is virtually disposed between two real image sensors, 18a and 18b for example. Data on the scene facilitate the simulation of the imaginary image sensor. Exemplary data include data on the terrain topography such as digital terrain map (DTM) or 3D model of buildings and other structures, and data on the absolute or relative state of cameras 18a and 18b, like position, direction of optical axis, camera's intrinsic parameters, relative position and mutual angle of the optical axes of cameras 18a and 18b. The position and direction of optical axis may be measured using the global positioning system (GPS). Examples of camera intrinsic parameters are focal length, principal point, field of view, and optical distortions.

The relative state of cameras 18a and 18b may be expressed by the fundamental matrix or by the essential matrix. The relative state of the cameras 18a and 18b may also be obtained by matching the images from each camera to one another using optical flow method. The images from cameras 18a and 18b may also be compared to another photograph, a synthetic photograph generated using an orthophoto and DTM, for example. That photograph is analyzed to get the position, angle and FOV or the absolute positions of at least several pixels. Then, the absolute positions, angles and intrinsic parameters of the images taken by cameras 18a and 18b are being calculated by matching them to the synthetic photograph.

The simulation of an imaginary image sensor may be conducted in a stepwise manner, generating a sequence of synthetic images while virtually moving the virtual image sensor between sequential intermediate positions between camera 18a and camera 18b. The synthetic images may be generated using the images of cameras 18a and 18b or by using images or 3D model data of the scene. For example, orthophoto images, DTM or other 3D model of the scene are used to generate an image from the desired point of view and the desired field of view (FOV).

A two-dimensional simulation may be used as an approximation to a full three-dimensional simulation.

Recall now the abovementioned example of switching the user interface 12 from being fed directly by image sensors 18a, 18b and 19 to being fed by the electronic circuitry 16. User interface 12 is controlled continuously by display interface 36 which in turn is linked with sensor interface 38 and image processor 44. Sensor controller 42 dominates sensors 18a, 18b and 19 and switches the viewing configuration by switching active sensors and/or active sensor configuration. On transition, the sensor interface 38 issues a command to the display interface for execution by the user interface 12 to switch from being fed directly by the image sensors 18a, 18b and 19 to being fed by the display interface 36 itself with images it gets from image processor 44.

Figure 3:
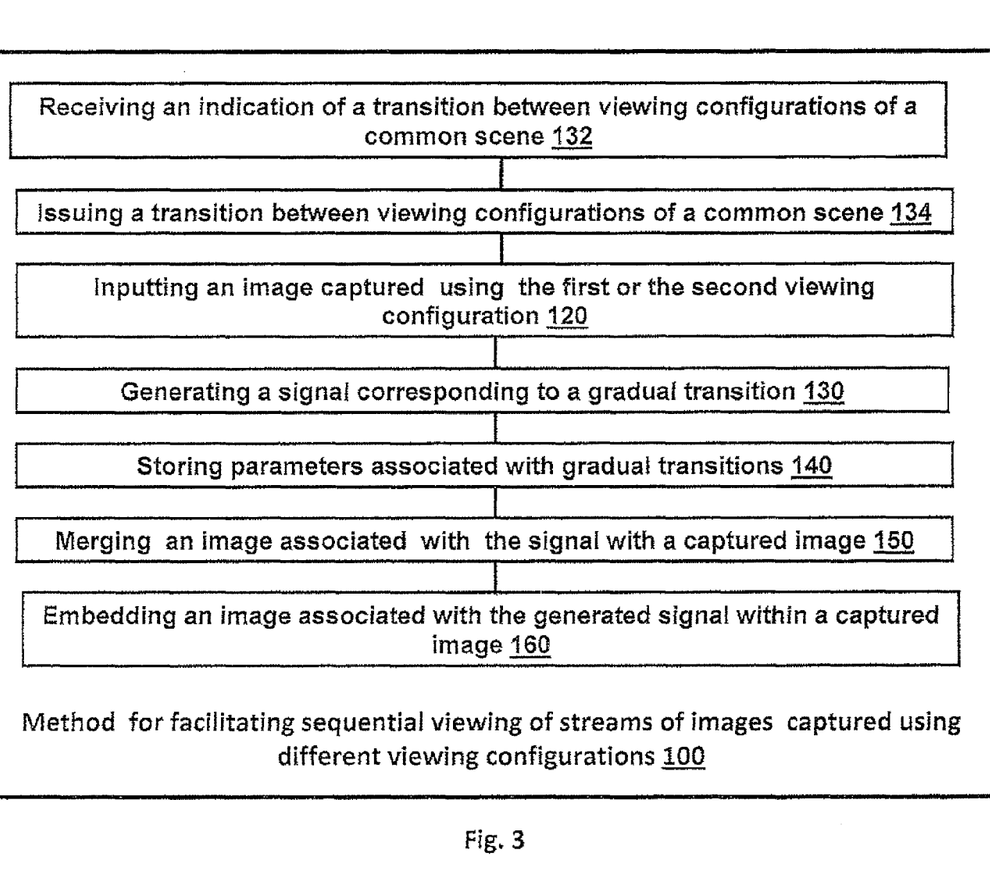
FIG. 3 is a flowchart of a method for sequential viewing of streams of images captured using different viewing configurations of a common scene.

FIG. 3 illustrates the flow chart of a method 100 for facilitating sequential viewing of streams of images captured using different viewing configurations of a common scene 6. Method 100 includes step 120 of inputting images captured using the first or the second viewing configurations, on transition between a first viewing configuration and a second viewing configuration, and step 130 of generating a signal, derived from the input images. The signal corresponds to a gradual graphic transition between images captured using a first viewing configuration and images captured using a second viewing configuration. The gradual graphic transition simulates a continuous view of the common scene 6.

It should be noted that the steps of method 100 may be performed in any order or simultaneously, unless it is clear from the context that one step depends on another being performed first In some embodiments, method 100 includes the step 132 of receiving an input indicative of a transition between a first viewing configuration and a second viewing configuration. Alternatively, method 100 includes the step 134 of issuing a command to make a transition between a first viewing configuration and a second viewing configuration.

In some embodiments, method 100 includes the step 140 of storing parameters associated with gradual graphic transitions. In some embodiments, the method includes the step 150 of merging an image associated with the signal with an image captured using the first or the second viewing configurations.

In some embodiments, method 100 includes step 160 of embedding an image associated with the signal within images captured using the first viewing configuration.

Figure 4:
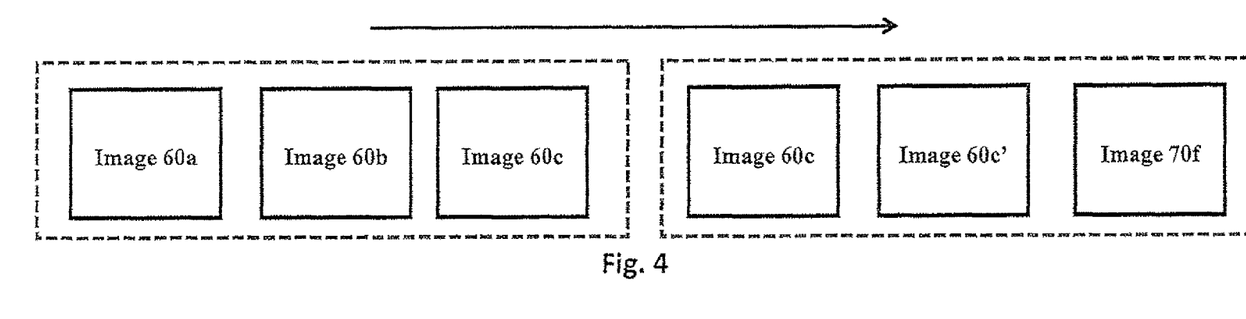
FIG. 4 is a block diagram of a series of images captured using the first viewing configuration followed by two images of a frozen scene and by an image captured using the second viewing configuration.

Referring now to FIG. 4, the signal is associated with two images 60c and 60c' derived from a single image 60c captured using the first viewing configuration. The first image is image 60c itself, while the second image 60c' is derived from image 60c. For example, image 60c" may be generated from image 60c by zooming in a portion of it and embedding the enlarged portion within image 80e. Thus, a frozen image captured using the first viewing configuration is used for the transition between the viewing configurations.

Figure 5A:
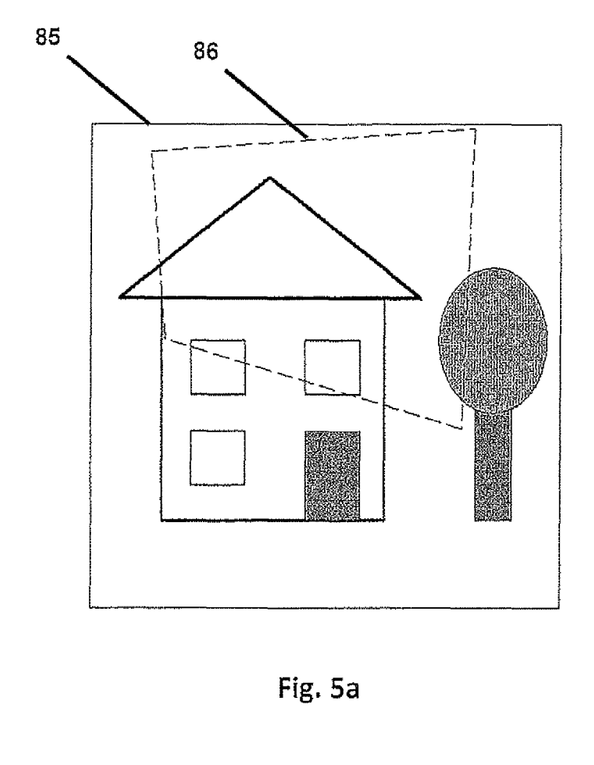
FIG. 5a is an image captured using a first image sensor located in a distant position in a front of a house.
Figure 5B:
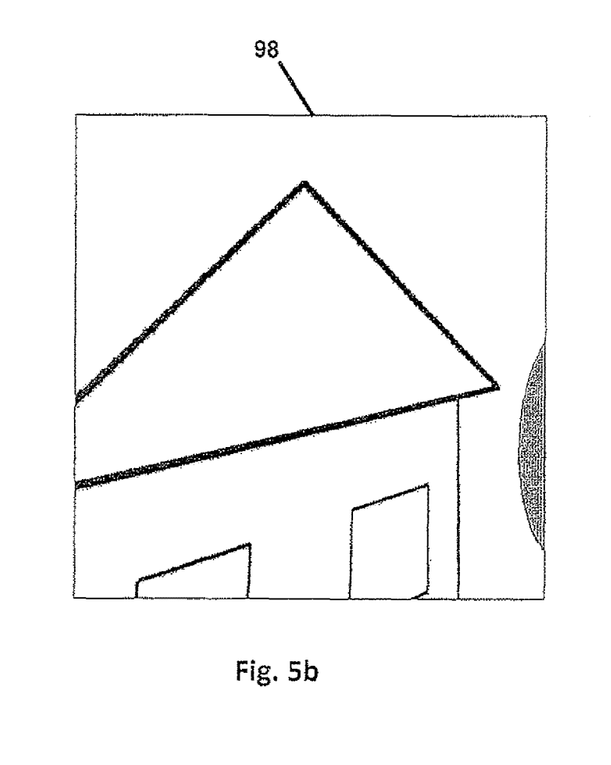
FIG. 5b is an image captured using a second image sensor located in a close position such that the line of sight is tilted relative to the front of the house.
Figure 6:
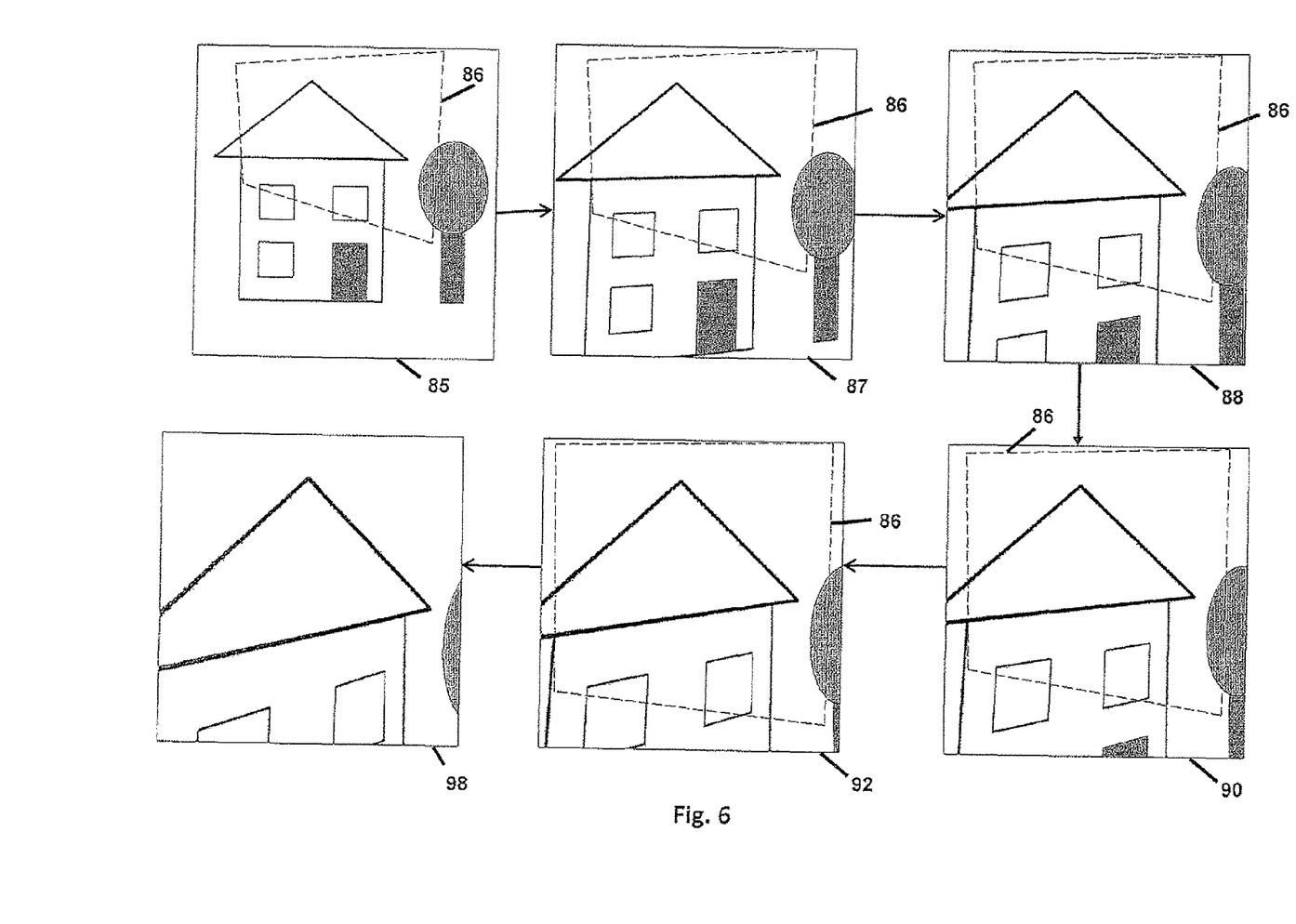
FIG. 6 shows a series of images used on transition between the two image sensors.

Referring now to FIGS. 5 and 6, a first image sensor is viewing a scene from a relatively distant position having a certain direction to the scene center. A second image sensor is viewing the same scene from a closer position having a different direction to the scene center FIGS. 5 and 5b illustrate a house captured by respectively the first sensor and the second sensor. FIG. 5a shows image 85 capturing a front distant view of a house and a nearby tree, while FIG. 5b shows image 98 capturing a tilted close view of the same scene. Frame 86, outlined on image 85, manifests the boundaries of the portion of the scene captured in image 98. On transition, image 85 may be followed by image 98 such that the observer losses orientation. FIG. 6 shows a series of images 87,88,90 and 92 created by image processor 44 to display a smooth transition. Images 87,88,90 and 92 may be created either with frozen image 85 as a source, or with live images from the second image sensor as a source. Thus, after displaying image 85, image 87 is displayed showing the scene a little bit closer and with a small tilt. Consequently, images 88, 90 and 92 are displayed gradually bringing the scene closer and more tilted. Finally, live image 98 captured by the second image sensor is displayed. Thus, the observer is kept oriented. Frame 86 may be overlaid on images 85,87,88,90 and 92 for even better orientation of the observer.

Note that, in general, a graphics card may generate the signal. In special, zooming in and zooming out may be done by certain graphics cards.

In some transitions, there is a delay of a certain period of time until capturing images of a predetermined quality. Several images derived from a single stored image 60c captured using the first viewing configuration may be displayed during the delay.

A program of instructions executable by a computerized apparatus to perform method 100 may be tangibly embodied in a storage media device readable by the computerized apparatus. Exemplary storage media device are a compact disk, a flash memory device, and an hard disk.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

What is claimed is:

1. Apparatus for facilitating sequential viewing of first and second streams of images of a common scene, the streams of images being captured by first and second image sensors, respectively, the first and second image sensors capturing the first and second streams of images from different viewing directions so as to generate visually dissimilar views of the common scene, the apparatus comprising electronic circuitry configured:
    (a) to input at least one image from at least one of said first and second streams of images; and
    (b) to generate a signal, derived at least in part from said at least one image, said signal corresponding to a gradual graphic transition between the viewing direction of the first image sensor and the viewing direction of the second image sensor, said gradual graphic transition simulating a continuous view of the common scene from intermediate viewing directions between the first viewing direction and the second viewing direction.

2. The apparatus of claim 1 wherein the electronic circuitry includes a merging module adapted for merging at least a portion of an image captured using said first image sensor with at least a portion of an image captured using said second image sensor.

3. The apparatus of claim 2, wherein said merging is conducted by at least one method of a group of methods consisting of fusing, blending, blurring, sharpening and embedding.

4. A system comprising:
    (a) an image sensor system comprising at least a first image sensor and a second image sensor, said first and second image sensors having different viewing directions so as to generate visually dissimilar views of a common scene;

(b) a user interface including a display for displaying a stream of images captured by said first image sensor followed by a stream of images captured by said second image sensor; and (c) electronic circuitry associated with said image sensor system and with said user interface, said electronic circuitry being configured:

(i) to input at least one image captured using at least one of said first and second image sensors, and (ii) to generate a signal, derived at least in part from said at least one image, said signal corresponding to a gradual graphic transition between the viewing direction of the first image sensor and the viewing direction of the second image sensor, said gradual graphic transition simulating a continuous view of the common scene from intermediate viewing directions between the first viewing direction and the second viewing direction.

5. The system of claim 4 wherein the first and second image sensors have different spectral sensitivities.

6. The system of claim 4 wherein the system includes a configuration database adapted for storing data on parameters associated with the viewing configurations.

7. The system of claim 4 wherein the system includes a graphic transition database adapted for storing one or more parameters associated with one or more gradual graphic transitions, wherein each transition is between said first and second image sensors.

8. The system of claim 4 wherein said user interface is connected to at least one image sensor of said image sensor system, whereby one or more streams of images are fed to said user interface directly from said first or said second image sensor until a transition between said first and second image sensors occurs during which transition said user interface is fed by said electronic circuitry.

9. A method for facilitating sequential viewing of first and second streams of images captured using first and second image sensors, respectively, from different viewing directions generating visually dissimilar views of a common scene, the method comprising:

(a) inputting at least one image from at least one of said first and second streams of images; and (b) generating a signal, derived at least in part from said at least one image, said signal corresponding to a gradual graphic transition between the viewing direction of the first image sensor and the viewing direction of the second image sensor, said gradual graphic transition simulating a continuous view of the common scene from intermediate viewing directions between the first viewing direction and the second viewing direction.

10. The method of claim 9 wherein the method further includes the step of issuing a command to make a transition between said first stream of images and said second stream of images.

11. The method of claim 9 wherein said gradual graphic transition is associated with a transformation selected from the group of transformations consisting of translation, linear transformation, affine transformation, homographic transformation, morphing, optical flow, and three-dimensional transformation.

12. The method of claim 9 wherein said gradual graphic transition is associated with a transformation including one or more interpolation steps.

13. The method of claim 9 wherein the method further includes the step of storing one or more parameters associated with one or more gradual graphic transitions, wherein each transition is between said first and second image sensors.

14. The method of claim 9 wherein the method includes the step of blending two images from at least one of said first and second streams of images.

15. The method of claim 9 wherein a graphics card generates said signal.

16. The method of claim 9 wherein said method further includes the step of embedding an image associated with said signal within one or more images captured using said first image sensor.

17. The method of claim 16 wherein the embedded image is a framed image.

18. The method of claim 9 wherein said signal is associated with two or more images derived from a single image captured using said first viewing configuration, thereby displaying a frozen scene captured using the first image sensor.

19. The method of claim 9 wherein the method is used in offline processing of an event captured using the first and second image sensors generating visually dissimilar views of the event.

20. A program storage non-transitory device readable by a computerized apparatus, tangibly embodying a program of instructions executable by the computerized apparatus to perform the method of claim 9.

21. The apparatus of claim 1, wherein said electronic circuitry is further configured to co-process at least one image from each of said first image sensor and said second image sensor with at least one reference image so as to derive parameters related to said viewing directions of said first and second image sensors.

22. The system of claim 4, wherein said electronic circuitry is further configured to co-process at least one image from each of said first image sensor and said second image sensor with at least one reference image so as to derive parameters related to said viewing directions of said first and second image sensors.

23. The method of claim 9, further comprising co-processing at least one image from each of said first image sensor and said second image sensor with at least one reference image so as to derive parameters related to said viewing directions of said first and second image sensors.

* * * * *